Feb. 12, 1946.     H. SCHMID ET AL     2,394,938
IMPULSE COUPLING FOR IGNITION MAGNETOS
Filed May 5, 1944     2 Sheets-Sheet 1
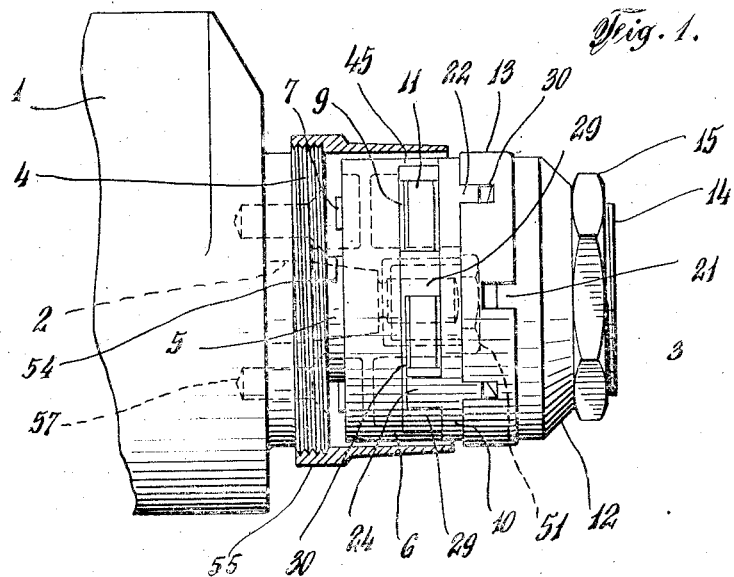
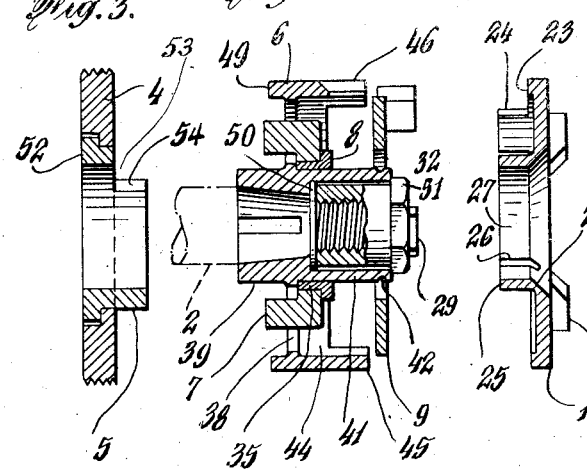
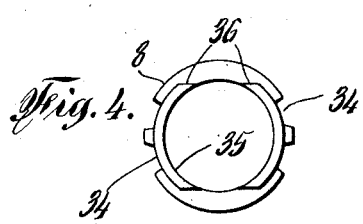
INVENTORS.
Herman Schmid
BY Albert P. Hobush
William F. Nickel
ATTORNEY

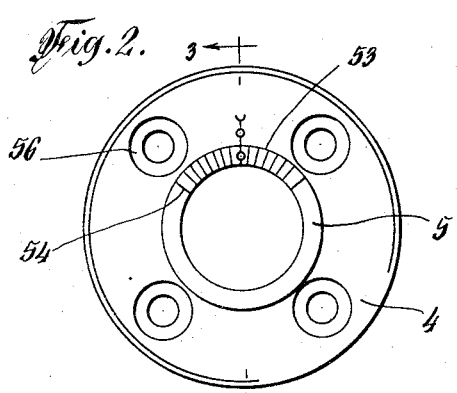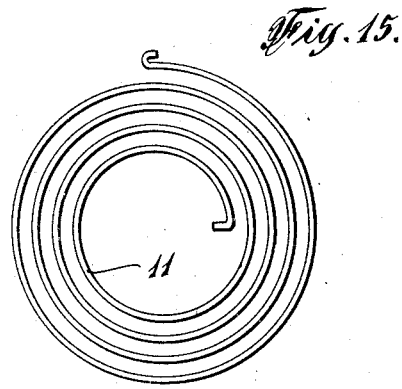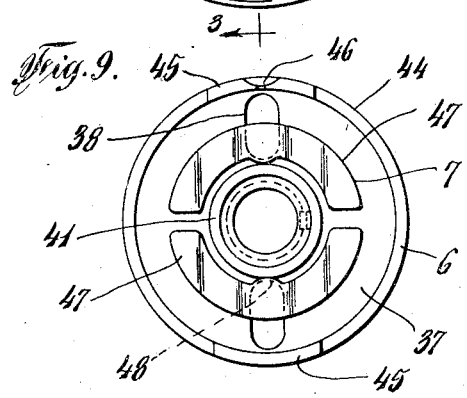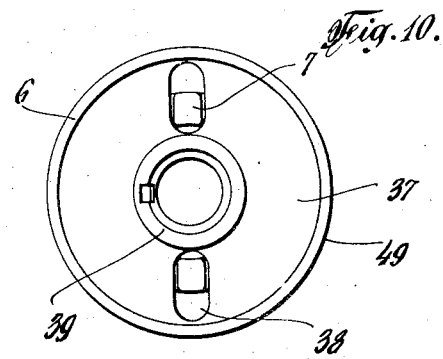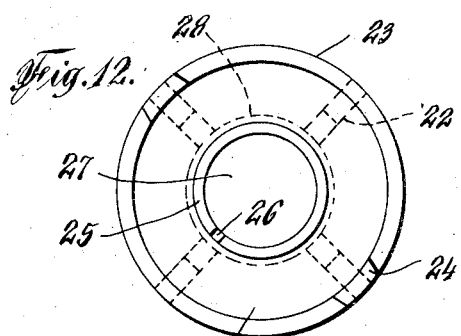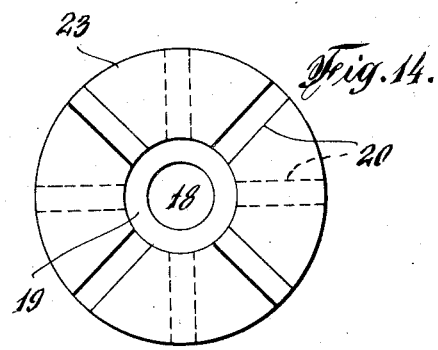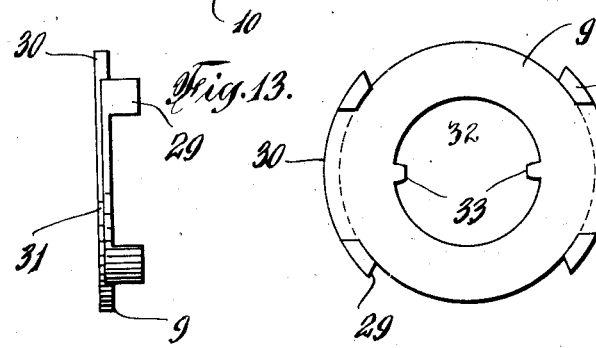

Patented Feb. 12, 1946

2,394,938

UNITED STATES PATENT OFFICE 2,394,938

IMPULSE COUPLING FOR IGNITION MAGNETOS

Herman Schmid and Albert P. Hobush, Mount Marion, N. Y.

Application May 5, 1944, Serial No. 534,386

5 Claims. (Cl. 171—209)

This invention relates to couplings for magnetos; and particularly to impulse couplings for ignition magnetos used in the operation of internal combustion engines.

A coupling of this type is usually mounted on the framework of the magneto, and is united to the armature or other rotor thereof and to a driving shaft actuated by the engine. It always comprises spring-connected parts, with stopping and releasing means serving to check the rotor when the engine rotates at low speed; and then liberate it, so that the said parts immediately throw or snap the rotor forward at sufficient velocity to ensure the required voltage and current to produce a good spark. As the engine speeds up, centrifugal force prevents the stopping means from acting further; and the device then becomes in effect a rigid coupling between the engine shaft and the magneto, to rotate the latter in the manner necessary to give ignition in each of the cylinders at the right instant.

An object of the invention is to provide an impulse coupling for ignition magnetos that is compact, durable and efficient; and of such design that risk of damage and impairment of function are virtually eliminated.

A further object is to provide an impulse coupling that will operate perfectly with but one spring constituting a yielding connection between its principal members or parts; and so mounted and secured in place that no pins or studs need to be riveted in place to serve as anchor posts for the ends of the spring. Thus danger of cracking or chipping any of the parts of the coupling is obviated.

Another object of the invention is to provide an impulse coupling in which all impacts of the members upon one another are reduced within safe limits, and to all intents and purposes deadened when the spring is put under tension and then released to throw the armature of the magneto forward. Hence all danger of any breakage in practice is completely removed.

On the drawings:

Figure 1 is a side view of an impulse coupling attached to an ignition magneto.

Figure 2 is a front view of the holder or mounting plate and the arrester cam.

Figure 3 is a section on line 3—3 of Figure 2.

Figure 4 is a front elevation of the releasing member or cam.

Figure 5 is a diametrical section of the operating member for the magneto shaft, the releasing cam and the actuator disk for the cam, showing these parts in separated relation for the sake of clearness.

Figure 6 is a similar section of the transmitting or tensioning member for the spring connecting this member and the actuator disk.

Figure 7 is a section of an intermediate connecting member.

Figure 8 is a section of the drive hub and drive member to be carried by a shaft of the engine to operate the impulse coupling.

Figures 9 and 10 are opposite face views of the driving member for the magneto shaft.

Figure 11 is an elevation of the release cam actuator disk seen from the right in Figure 5.

Figure 12 is a face view of the spring tensioning member seen from the left in Figure 6.

Figure 13 is a side view of the actuator disk.

Figure 14 is a face view of the connecting member of Figure 7 which couples the impulse coupling to the driving hub and member on the engine shaft, and Figure 15 shows the spiral spring in the starter.

On the drawings the same numerals identify the same parts throughout.

In Figure 1, a part of the framework of an ignition magneto for an internal combustion engine or motor is shown at 1. The shaft 2 of the armature of the magneto projects at one end, and to this end the impulse coupling of this invention, indicated as a whole at 3, is secured. At its outer end the coupling is connected to a shaft mounted in the framework of the engine to be operated.

On the front of the framework of the magneto is the mounting plate or holder 4 for the arrester cam 5. The mounting plate is affixed to the magneto by screws and the plate 4 and magneto 1 have suitable holes for this purpose. The mounting plate 4 has a central aperture through which the shaft 2 passes, and within this aperture the arrester cam 5, which is ring shaped, is placed. The cam 5 is made fast, but is preferably adjustable; and for this purpose both the cam 5 and plate 4 have a special shape and design, as set forth in our application for patent thereon, Serial No. 534,387, filed of even date herewith.

The impulse coupling contains an operating member 6 which carries the arrester pawls or dogs 7 which cooperate with the cam 4 when the engine first turns over. These dogs 7 are freed from the cam 5 by the release cam 8, which lies at the middle of the actuator disk 9, and is adjustably secured thereto. Adjacent the actuator element or disk 9 is the tensioning or transmitting member 10, the parts 6 and 10 being joined by a spiral spring 11. The driving member 12, rotated by the engine, imparts motion to the member 10 and the coupling through an intermediate connecting element 13. The member 12 is screwed upon a drive hub 14, and held tight by a lock nut 15. The hub 14 has a bore 16 with a keyway 17 which receives a key on the shaft of the engine by which the coupling is revolved.

The connecting element 13 is preferably made of fiber, the other parts of the coupling being of metal. This element has a central opening 18 both ends of which are counterbored or enlarged as at 19. Each face of the element has four radial grooves 20 from opening to circumference, spaced 90 degrees apart; the grooves on one face lying midway between the positions of those on the opposite face. The adjacent face of the driving member 12 has radial lugs or projections 21 which fit into the grooves 20 on one face of the element 18, and the transmitting member 10 has similar lugs 22 to fit into the grooves 20 on the opposite face of this connecting element 18. Due to the arrangement of the grooves on the two faces of this element, the members 10 and 12 can be adjusted through an angle of 45 degrees in either direction. The grooves 20 increase in depth toward the circumference of the element 18, and the lugs 21 and 22 are beveled at their inner ends. Hence the lugs and the grooves have a marked centering effect when the element 18 and members 10 and 12 are put together, with the result that the rims or circumferences of these three parts all come into flush relations.

The transmitting member or disk 10 has a rim 23 facing the actuator disk 9 on the face opposite the lugs 22, and from this rim extend two approximately square-shaped projections 24 at diametrically opposite points. At the center, on the same face the disk has a cylindrical hub 25, with a notch or recess 26 for one hooked end of the spring 11. The bore or passage 27 through this hub is counterbored at 28 on the face of the disk bearing the lugs or ribs 22.

The actuator 9 has four projections 29 at its rim extending from the face which when the plate 9 is in position, is presented to the member 10. These projections are at the ends of arc-shaped segments 30 which are flush with said face of the disk 9, but are of less thickness than the disk, thereby forming shoulders 31 presented to the opposite face. The disk 9 has a central opening 32 with opposite projections 33, and this opening is large enough to receive the release cam 8. The latter has two pairs of recesses 34 into which the projections 33 of the actuator disk fit. One pair of recesses 34, at diametrically opposite points in the rim of the cam 8 is for use when the rotation of the magneto is clockwise; the remaining pair is to be used with the projections 33 of the disk 9 for counter-clockwise rotation.

From one face of the cam 8 extend the two semi-cylindrical projections 35. These projections are separated a slight distance at their ends, and the extremities are beveled from their outer to their inner faces, as indicated at 36.

The coupling operating member 6 has a web 37 with radial slots 38 on both sides of a central hub 39 which has a bore shaped to receive the conical end of the magneto shaft 2. This hub extends at one end from one face of the web 37 towards the magneto, and the shaft 2 is keyed therein. The hub extends from the opposite face of the web 37, forming a cylindrical projection 41, which serves as a mounting journal for the cam 8, actuator 9 and member 10. This projection 41 is of less diameter than the cylindrical hub 25 of the member 10, and has an encircling groove 42 at its end for a lock ring 43 in the counterbore 28 of the member 10. This counterbore marks the position of the ring 43 when the parts 6, 8, 9 and 10 are assembled.

Surrounding the hub extension 41 is a rim 44 which has a pair of large projections 45, one having a notch 46 for the outer hooked end of the spring 11. The dogs 7 in the slots 38 have curved arms 47 which lie adjacent the extension 41 and these dogs have noses 48 for the cam projections 35 to engage. A shorter rim 49 projects from the member 6 around the hub 39 and the bore of the extension or sleeve 41 is enlarged to form an internal shoulder for a lock washer 50. This washer and a sleeve nut 51 secure the coupling upon the magneto shaft 2.

To assemble the operating member 6, actuator 9, cam 8 and transmitting member 10, the cam is pushed upon the cylindrical extension 41 till its two projections 35 lie between this extension and the dogs 7. Then the actuator 9 is slipped over it the projections 33 being made to enter the proper recesses 34 according to the direction of rotation. The rim of the disk 9 now lies within the rim 44 of the member 6 with the peripheral segments 30 of the disk 9 against the flat end of the rim 44; making a snug fit; with these segments between the projections 45. The spring 11 is hooked at one end in the notch 46 and placed between the projections 45 of the member 6; and then the member 10 is attached by moving the notch 26 of the extension 25 into line with the inner hooked end of the spring so that this end enters said notch, when the hub 25 is slipped over the extension 41. The member 10 is now turned by hand to wind up the spring and carry the square projections 24 on said member into position to be moved in against the segments 30 of the disk 9 and between the projections 29 at the ends of each segment 30. The lock ring 43 is now slipped into the groove 42, and the lock washer 50 and nut 51 are screwed on to connect the coupling and armature shaft 2 together. The element 13, the member 12 and the hub 14 are easily mounted to connect the coupling with the drive shaft.

The ring-shaped cam 5 is completely circular at one end, and there it has a flange 52 which engages an annular shoulder in the holder 4 on the side thereof which fits against the magneto 1. The cam projects through the holder 4 and a recess 53 is cut into its end on the opposite face at the top. The ends of this recess provide stop shoulders 54 against which one of the dogs 7 strikes at a low speed of rotation. When the rim 49 of the drive member 6 is near to the holder 4, the cam 5 is near to the web 37, and the dogs 7 overlap the adjacent extremity of the cam 5. A cover 55 is screwed upon the holder 4 and extends as far out as the fiber disk 13. The holder 4 has screw holes 56 for screws 57 by which the coupling is secured to the magneto 1.

In operation, when the engine is turned over at low speed, the dog 7 which passes through topmost position will fall of its own weight when it reaches the recess 53 in between the stop shoulders 54, the magneto being upright and the recess 53 being at the top of the arrester cam 5. The cam 8 now has one of its spaces between the adjacent ends 36 of the curved projections 35 thereon in position to permit this. Thus the operating member 6 is momentarily checked. At this instant the parts are nearly in the positions shown in Figure 1. Assuming the rotation to be clockwise or upward on the side toward the observer, the actuator 9 is then held by the projections 24 of member 10 with the trailing projection 29 of each pair of projections on the actuator against one of the projections 45 of the member 6. This is due to the action of the spring 11 on the transmitting or tensioning member 10. The other or leading projection 29 of each pair is spaced from both the adjacent projection 24 on the member 10 and the other projection 45. The drive shaft continuing to rotate now turns the hub 14 and parts 12, 13 and 10 further, putting the spring 11 under more tension and moving the projections 24 away from each trailing projection 29 that is in contact with a projection 45 on the member 6. The actuator 9 remains stationary at this instant, but when the member 10 carries its projections 24 against the leading projections 29 on the actuator, the latter moves with the member 10 and carries the cam 8 with it, so that the beveled end 36 of one of the curved projections 35 now lifts the dog 7 out of engagement with the shoulder 54 that has arrested it. The member 6 is now liberated and the force of the spring 11 snaps it sharply forward, rotating the armature fast enough to give an ignition spark. The release takes place before the upper or leading projection 29 in Figure 1 arrives at the upper projection 45 on the member 6; and the same with the leading projection 29 diametrically opposite in relation to the lower projection 45. Whenever the release of the member 6 is effected, the disk 9 acts to prevent injurious impacts between the members 6 and 10. When the former is thrown forward by the spring 11, the projections 45 first strike the trailing projections 29 of the disk 9; and as this disk with cam 8 can rotate freely on the extension 41 it is now turned by the member 6 till the trailing projections 29 of each pair catch up with the projections 24 of the member 10. The impact between the projections 45 and the trailing projections 29 and the latter and the projections 24 is thus made very light and all risk of damage or breakage is virtually eliminated.

The action is repeated till the engine commences to run under its own power. Centrifugal force then causes the dogs 7 to clear the stop cam 5 and the magneto rotates as if it were rigidly coupled to the drive hub 14.

Having described our invention, what we believe to be new is:

1. An impulse coupling having an operating member having projections, a transmission member having projections between the first-named projections, a spring united to said members and forming a yielding connection, and an intermediate actuator member having projections between the projections on the operating member and those on the transmitting member to deaden impacts due to the action of said spring, all of said projections being disposed in substantially the same rotational-path.

2. An impulse coupling having an operating member carrying movable dogs, said member having a projection at its rim, a transmission member having a central hub, a single spring attached to said projection and said hub, and an intermediate actuator member having projections disposed adjacent the aforesaid projection, said intermediate member being free to turn and move the projections thereon between the other two members, said transmission member having a projection disposed between the projections on the actuator member, all of said projections being disposed in substantially the same rotational-path.

3. An impulse coupling comprising an operating member to be secured to the shaft of the rotor of a magneto, said member having a rim extending away from the magneto, said rim having oppositely disposed projections, an intermediate actuator member having a pair of projections at each side disposed between the first named projections, a transmission member having a projection at each side extending between the projections of each pair on the intermediate member, a release cam in the operating member connected to the intermediate member, and a flat coiled spring connecting the operating and transmission members.

4. An impulse coupling comprising an operating member, an intermediate actuator member, a release cam on the operating member connected to the intermediate actuator member, a transmission member, a single spring connecting the operating and transmission members, a drive member, and a connecting element between the drive and transmission members, said element having on both faces radial grooves which deepen away from the inner ends thereof; and said drive and transmission members having ribs with their inner ends beveled to engage said grooves.

5. An impulse coupling comprising an operating member to be secured to the shaft of the rotor of a magneto, with a hub and rim which extend away from the magneto, a transmission member having an extension which fits over said hub to mount the transmission member thereon, a coiled spring attached at one end to said extension and to said rim at the other, an intermediate member between said operating and transmission members, and a release cam on said hub connected to the intermediate member.

HERMAN SCHMID.
ALBERT P. HOBUSH.